US005733694A

United States Patent [19]

Takehana et al.

[11] Patent Number: 5,733,694

[45] Date of Patent: Mar. 31, 1998

[54] ELECTROPHOTOGRAPHIC TRANSFER FILM AND COLOR IMAGE FORMATION PROCESS

[75] Inventors: Tadashi Takehana; Yoshio Tani, both of Fujinomiya; Kiyoshi Hosoi; Katsumi Harada, both of Ebina, all of Japan

[73] Assignee: Fuji Xerox Co., Ltd., Tokyo, Japan

[21] Appl. No.: 673,362

[22] Filed: Jun. 28, 1996

[30] Foreign Application Priority Data

Jul. 4, 1995 [JP] Japan .................................... 7-191238

[51] Int. Cl.$^6$ .......................... G03G 13/01; B32B 27/10; B32B 27/36

[52] U.S. Cl. .......................... 430/47; 430/126; 428/480; 428/481

[58] Field of Search .................................... 428/480, 481; 430/47

[56] References Cited

U.S. PATENT DOCUMENTS

| | | | |
|---|---|---|---|
| 5,229,188 | 7/1993 | Takeuchi et al. | 428/195 |
| 5,352,553 | 10/1994 | Takeuchi et al. | 430/42 |

FOREIGN PATENT DOCUMENTS

| | | |
|---|---|---|
| A-59-184361 | 10/1984 | Japan . |
| A-60-52861 | 3/1985 | Japan . |
| A-61-36756 | 2/1986 | Japan . |
| A-61-36762 | 2/1986 | Japan . |
| A-63-80273 | 4/1988 | Japan . |
| A-2-263642 | 10/1990 | Japan . |
| A-3-198063 | 8/1991 | Japan . |
| A-4-125567 | 4/1992 | Japan . |
| A-4-212168 | 8/1992 | Japan . |
| A-5-88400 | 4/1993 | Japan . |

*Primary Examiner*—Roland Martin
*Attorney, Agent, or Firm*—Oliff & Berridge, PLC

[57] ABSTRACT

The present invention provides an electrophotographic transfer film which can provide improvements in the color development at the half tone (dot) area of a projected image and the anti-offset properties. A novel electrophotographic transfer film is disclosed which comprises an image receiving layer provided on at least one side of a transparent support is provided, wherein the image receiving layer comprises a polyester including (i) a repeating unit of a dibasic acid component containing at least one dicarboxylic acid unit selected from the group consisting of a telephthalic acid unit and a 2,6-naphthalenedicarboxylic acid unit, and a sulfobenzenedicarboxylic acid unit; and (ii) a repeating unit of a divalent alcohol component containing an ethylene glycol unit, a triethylene glycol unit and a bisphenol A-ethylene oxide adduct unit. A color image formation process is also provided which comprises forming a color image on the electrophotographic transfer film.

13 Claims, 3 Drawing Sheets

ELECTROPHOTOGRAPHIC TRANSFER FILM AND COLOR IMAGE FORMATION PROCESS

FIELD OF THE INVENTION

The present invention relates to an electrophotographic transfer film suitable for the formation of a projected image using an indirect dry electrophotographic copying machine, full color electrophotographic copying machine or printer for ordinary paper and a color image formation process for the formation of a color image thereon. More particularly, the present invention relates to an electrophotographic transfer film which can be used in OHP (overhead projector) and a color image formation process for the formation of a color image thereon.

BACKGROUND OF THE INVENTION

As a method for easily obtaining a projected image there has been widely used a method which comprises using an electrophotographic transfer film (a film to be transferred for electrophotography; hereinafter sometimes referred to as "transparent film") on an indirect dry electrophotographic copying machine in place of ordinary paper. In this method, a toner image is formed on the electrophotographic transfer film. The toner image is then projected by an OHP (overhead projector) to give a projected image (transmitted image). In particular, with the recent spread of indirect dry full color electrophotographic copying machines and various printers, a technique has been more popular which comprises forming a color image on a transparent film, and then projecting the color image by an OHP. Accordingly, an electrophotographic transfer film has been required which can form a projected image having an excellent color development.

However, electrophotographic transfer films for monochromatic (black-and-white) indirect dry electrophotographic copying machine which have been heretofore used have remarkably improved conveyability (running properties) and toner fixability but leave much to be desired in the formation of color image. In other words, when a color image is formed on the foregoing electrophotographic transfer film using an indirect dry full color electrophotographic copying machine or various printers, an image projected by an OHP shows an insufficient color development particularly at the half tone area, making it impossible to obtain a satisfactory color image. As a result, a stained (turbid) image is obtained. This phenomenon is attributed to a surface roughness on the transparent film caused by the toner image (toner grains) formed thereon. Light projected by the OHP is scattered by the surface roughness to give a stained projected image. The surface roughness is more vigorous and gives much stain particularly at the half tone area. Accordingly, it is necessary that such surface roughness be minimized.

For example, JP-A-59-184361 (The term "JP-A" as used herein means an "unexamined published Japanese patent application") proposes a method which comprises spray-coating a lacquer onto the surface of a toner image. However, this method is disadvantageous in that the toner is dissolved in the solvent, causing an image sharpness drop, color unevenness and stain at non-image area. JP-A-60-52861 proposes a method which comprises coating a toner image with a laminate film. Further, JP-A-61-36756 and JP-A-61-36762 propose a method which comprises laminating a toner image with a transparent film, fixing the toner image by means of a heat roll, and then stripping the transparent film off the laminate. However, these methods are disadvantageous in that the image formation requires many subsequent treatment steps and the toner image can be easily destroyed when the transparent film is stripped off.

Further, JP-A-63-80273 proposes a method which comprises fixing the toner image at a temperature where the toner can be sufficiently melted, a method which comprises fixing the toner image with a solvent such as toluene, a method which comprises polishing the fixed image, and a method which comprises coating the fixed toner image with a transparent coating which doesn't dissolve the toner therein. In the case where the toner image is fixed over a roll at the melting temperature of the toner, if the surface roughness at an area having a small amount of toner such as half tone area is reduced, offset can easily occur at an area having a large amount of toner. On the other hand, a non-contact heat-fixing apparatus such as oven is used, the transparent film itself can easily wave, and a prolonged fixing time is required to obtain a sufficient light transmission. In the case of the method which comprises the use of a solvent, if the toner fluidity is raised by adding a solvent until the surface roughness at the half tone area is reduced, the toner image can be destroyed at a high density area. In the method which comprises polishing the fixed image, the light transmission can be improved at an area having a relatively large amount of toner but can be little improved at an area having a small amount of toner. If the toner image is coated with a transparent coating, a definite interface can be formed between the toner image and the coating film. The interface thus formed can scatter the incident light to give a dark projected image with a low saturation.

JP-A-3-198063 proposes the use of a polymer having a melting point of not higher than Tg (glass transition temperature) of the toner binder and a melting temperature of lower than that of the toner binder to smoothen the toner image. Further, JP-A-4-125567 proposes a transfer medium comprising a toner image retaining layer made of a thermoplastic resin having a lower softening point than toner provided on a transparent substrate. JP-A-4-212168 proposes an electrophotographic copying sheet which comprises a film layer made a resin having a lower fluidization temperature than toner to provide a glossy image that gives a projected image having an enhanced color reproducibility. Moreover, JP-A-5-88400 proposes an electrophotographic copying sheet comprising on the surface of a plastic film a transparent resin layer which exhibits a lower apparent melt viscosity than the toner binder resin at the toner fixing temperature.

However, if the image receiving layer (transparent resin layer) comprises a resin having a lower melt viscosity or softening point than the toner binder resin, the image receiving layer softens more quickly than the toner when heated under pressure by the fixing roll. As a result, the image receiving layer is attached to the fixing roll from which it then moves to other transfer materials (offset). In other words, the fixed image slightly waves as shown on shell, causing stain on projected image. The image receiving layer moves to the fixing roll during fixing, causing the image to disappear. Further, the image receiving layer is attached to the fixing roll, causing a transparent film to be wound on the fixing roll (such a phenomenon is hereinafter referred to as "offset").

Further, JP-A-2-263642 proposes an electrophotographic transfer film which comprises on a transparent support a transparent resin layer having a predetermined solubility parameter and a higher storage elastic modulus than the toner binder resin at the toner fixing temperature so that a good compatibility with the toner binder resin can be provided to minimize the surface roughness of the toner image and hence inhibit the occurrence of the foregoing offset. However, even if the polymer constituting the transparent resin layer satisfies the requirement for solubility parameter and storage elastic modulus, the melted toner cannot be thoroughly embedded in the resin layer, making it impossible to minimize the surface roughness of the toner image. Accordingly, this proposal cannot provide improvements in the color development particularly at the half tone area on the projected image.

As mentioned above, the conventional electrophotographic transfer films cannot provide improvements in the color development at the half tone area of a projected image and the anti-offset properties. The inventors made extensive studies of an electrophotographic transfer film satisfying the two requirements. The use of a polyester resin as a polymer constituting the image receiving layer of an electrophotographic transfer film can provide relatively good properties. Thus, the inventors made studies of polyester resins. There are some examples of the use of a polyester as a polymer constituting the image receiving layer. However, no reference has been made to specific constitution except the use of bisphenol A-ethylene oxide adduct (JP-A-5-88400). Thus, the inventors made studies of polyesters obtained from a wide range of materials and combinations thereof. As a result, it was found that the use of a polyester having the following specific constitution can provide an electrophotographic transfer film satisfying the foregoing requirements. Thus, the present invention has been worked out.

SUMMARY OF THE INVENTION

It is therefore an object of the present invention to provide an electrophotographic transfer film which can provide improvements in the color development at the half tone area of a projected image and the anti-offset properties.

It is another object of the present invention to provide a color image formation process which can form on an electrophotographic transfer film a color image that gives a projected image having an excellent color development on the half tone area using an electrophotographic copying machine.

These and other objects of the present invention will become more apparent from the following detailed description and examples.

The foregoing objects of the present invention can be accomplished with an electrophotographic transfer film comprising an image receiving layer provided on at least one side of a transparent support, wherein the image receiving layer comprises a polyester including a repeating unit of a dibasic acid component and a repeating unit of a divalent alcohol component, wherein the repeating unit of the dibasic acid component comprises at least one dicarboxylic acid unit selected from the group consisting of a telephthalic acid unit represented by formula (a) and a 2,6-naphthalenedicarboxylic acid unit represented by formula (b), and a sulfobenzenedicarboxylic acid unit represented by formula (c):

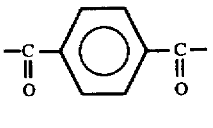
(a)

-continued

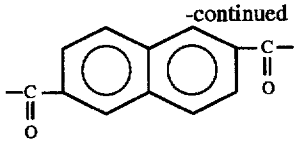
(b)

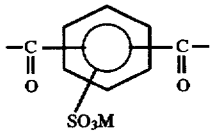
(c)

wherein M represents a hydrogen atom or an alkali metal, wherein the repeating unit of the divalent alcohol component comprises an ethylene glycol unit represented by formula (d), a triethylene glycol unit represented by formula (e) and a bisphenol A-ethylene oxide adduct unit represented by formula (f):

$-O-CH_2CH_2O-$ (d)

$-O-(CH_2CH_2O)_3-$ (e)

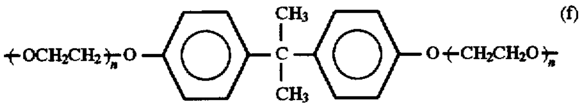
(f)

wherein n represents an integer of from 1 to 5.

Preferred embodiments of the electrophotographic transfer film according to the present invention will be given below.

(1) The foregoing repeating unit of dibasic acid component constituting the polyester comprises at least one dicarboxylic acid unit selected from the group consisting of a terephthalic acid unit represented by formula (a) and a 2,6-naphthalenedicarboxylic acid unit represented by formula (b) in an amount of from 60 to 95 mol % and a sulfobenzenedicarboxylic acid unit represented by formula (c) in an amount of from 5 to 17 mol % and the repeating unit of divalent alcohol component comprises an ethylene glycol unit represented by formula (d) in an amount of from 10 to 60 mol %, a triethylene glycol unit represented by formula (e) in an amount of from 30 to 90 mol % and a bisphenol A-ethylene oxide adduct unit represented by formula (f) in an amount of from 5 to 40 mol %.

(2) The foregoing repeating unit of dibasic acid component constituting the polyester comprises a terephthalic acid unit represented by formula (a) in an amount of from 60 to 95 mol %, an isophthalic acid unit represented by formula (g):

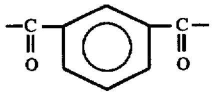
(g)

in an amount of from 0 to 35 mol %, and a sulfobenzendicarboxylic acid unit represented by formula (c) in an amount of from 5 to 17 mol %.

(3) The foregoing repeating unit of dibasic acid component constituting the polyester comprises an isophthalic acid unit represented by formula (g) in an amount of from 0 to 35 mol %, a 2,6-naphthalene dicarboxylic acid unit represented by formula (b) in an amount of from 60 to 95 mol %, and a sulfobenzendicarboxylic acid unit represented by formula (c) in an amount of from 5 to 17 mol %.

(4) The foregoing repeating unit of dibasic acid component constituting the polyester comprises a terephthalic acid unit represented by formula (a) in an amount of from 0 to 90 mol %, an isophthalic acid unit represented by formula (g) in an amount of from 0 to 35 mol %, a 2,6-naphthalenedicarboxylic acid unit represented by formula (b) in an amount of from 10 to 90 mol %, and a sulfobenzendicarboxylic acid unit represented by formula (c) in an amount of from 5 to 17 mol %.

(5) The number-average molecular weight of the polyester is in the range of from 1,500 to 5,000.

(6) The weight-average molecular weight of the polyester is in the range of from 2,500 to 15,000.

(7) The weight-average molecular weight/number-average molecular weight ratio of the polyester is in the range of from 1.2 to 3.0.

(8) The image receiving layer further comprises a surface active agent and a matting agent incorporated therein and has a surface electrical resistance of from $1\times10^9$ to $1\times10^{13}\Omega$ at 25° C. and 65%RH.

(9) The image receiving layer is formed in such an arrangement that it makes a contact angle of not more than 50 degrees with the toner to be fixed (comprising a coloring material and a binder resin, or a magnetic powder and a binder resin) at the fixing temperature of the toner.

(10) The thickness of the image receiving layer is in the range of from 1 to 8 μm.

(11) The transparent support is made of a polyethylene terephthalate.

(12) The foregoing electrophotographic transfer film is adapted for the formation of a color image.

The foregoing objects of the present invention can also be accomplished by a color image formation process, which comprises repeating the following steps (1) to (3):

(1) imagewise exposing the surface of a photoreceptor to light to form a latent image thereon;

(2) developing said latent image with one of two or more toners for forming a color image to form an image on the surface of the photoreceptor; and (3) transferring said image to an electrophotographic transfer film as defined above, by the number of said toners to transfer a color image to said electrophotographic transfer film, and then pressing said toner image thus transferred under a heat roll heated to the fixing temperature of said toner to form a color image on said electrophotographic transfer film.

BRIEF DESCRIPTION OF THE DRAWINGS

By way of example and to make the description more clear, reference is made to the accompanying drawings in which.

DETAILED DESCRIPTION OF THE INVENTION

Figure 1:
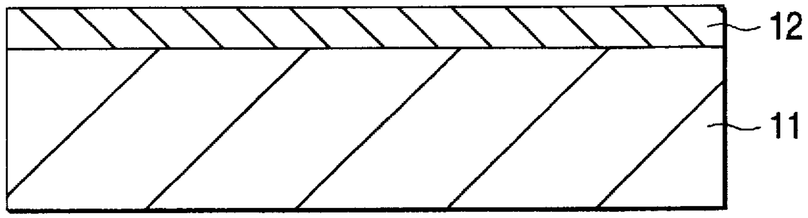
FIG. 1 is a sectional view illustrating a typical example of the basic structure of the electrophotographic transfer film according to the present invention.
Figure 2:
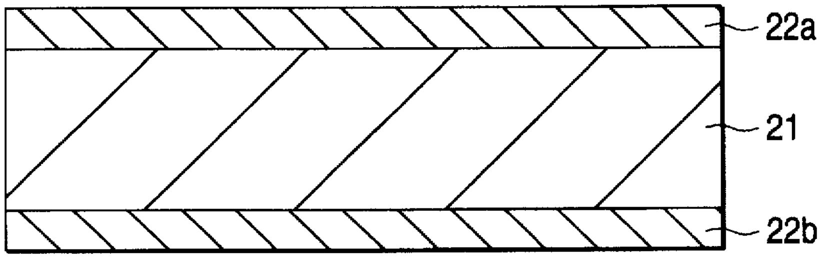
FIG. 2 is a sectional view illustrating another typical example of the basic structure of the electrophotographic transfer film according to the present invention.
Figure 3:
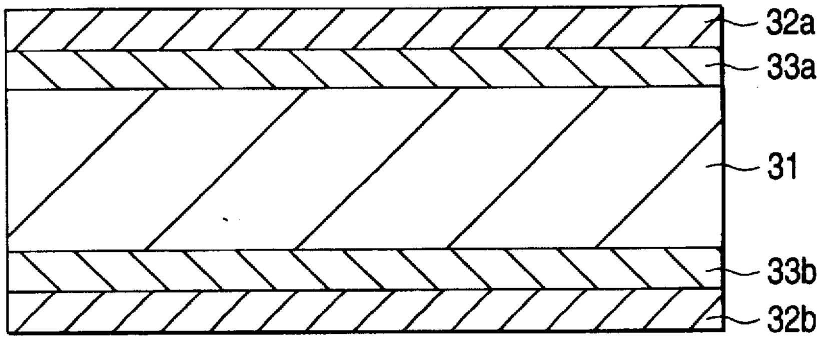
FIG. 3 is a sectional view illustrating a further typical example of the basic structure of the electrophotographic transfer film according to the present invention.

The electrophotographic transfer film according to the present invention essentially comprises an image receiving layer formed on either or both sides of a transparent support. FIGS. 1 and 2 are sectional views illustrating a typical basic structure of the electrophotographic transfer film according to the present invention. FIG. 3 is a sectional view illustrating a typical structure of an electrophotographic transfer film comprising an electrically-conductive undercoating layer provided interposed between the transparent support and the image receiving layer.

FIG. 1 illustrates an electrophotographic transfer film comprising an image receiving layer 12 formed on one side of a transparent support 11. An electrically-conductive undercoating layer may be provided interposed between the transparent support and the image receiving layer. A back layer for rendering the transparent support slippery and electrically conductive and enhancing the running properties of the film may be provided on the side of the transparent support opposite the image receiving layer.

FIG. 2 illustrates an electrophotographic transfer film comprising an image receiving layer (22*a*, 22*b*) on both sides of the transparent support 21.

FIG. 3 illustrates an electrophotographic transfer film comprising an electrically-conductive undercoating layer (33*a*, 33*b*) provided on both sides of the transparent support 31 and an image receiving layer (32*a*, 32*b*) provided on both the electrically-conductive undercoating layers 33*a* and 33*b*.

As the foregoing transparent supports 11, 21 and 31 there may be used any transparent material which can withstand radiation heat when used as an OHP sheet. Examples of such a material include polyester such as polyethylene phthalate;

cellulose ester such as nitrocellulose, cellulose acetate and cellulose acetate butyrate; polysulfone; polyphenylene oxide; polyimide; polycarbonate; and polyamide. The film obtained from such a material preferably can withstand a temperature of not lower than 100° C. Preferred among these materials is polyethylene terepthalate film because of its excellent heat resistance and transparency. The thickness of the film is not specifically limited but is preferably from 50 to 200 μm because of ease of handling.

A film which cannot withstand a temperature of not lower than 100° C. tends to deform and wave when a toner is heated and fixed thereto. The film to be used in the present invention is preferably so thick that it is little susceptible to wrinkling when softened under heating upon fixing. Accordingly, the thickness of the film is preferably not less than 50 μm, more preferably not less than 75 μm. The upper limit of the thickness of the film is preferably not more than 200 μm, more preferably not more than 150 μm, taking into account the reduction of light transmittance. Thus, the thickness of the heat-resistant plastic film is preferably from 50 to 200 μm, more preferably from 75 to 150 μm.

The image receiving layers 12, **22*a*, 22*b*, 32*a* and 32*b*** each comprise as a polymer a polyester including (i) a repeating unit of dibasic acid component containing at least one dicarboxylic acid unit selected from the group consisting of a terephthalic acid unit represented by formula (a) and a 2,6-naphthalenedicarboxylic acid unit represented by formula (b), a sulfobenzenedicarboxylic acid unit represented by the general formula (c), and (ii) a repeating unit of a divalent alcohol component containing an ethylene glycol unit represented by formula (d), a triethylene glycol unit represented by formula (e) and a bisphenol A-ethylene oxide adduct unit represented by formula (f).

The foregoing polyester softens so properly at the fixing temperature of the toner that the toner can be embedded in the image receiving layer. Further, the angle of inclination of the surface of the image receiving layer to the toner (described later) is normally so small that a fixed image with little roughness can be obtained. Moreover, the use of the foregoing polyester causes the toner and the image receiving layer (polyester) to be compatibilized with each other at their interface, resulting in the production of little interface therebetween. This causes little or no refraction of light from the overhead projector, making it possible to obtain an image that gives a stainless projected image having an excellent color development.

In the foregoing polyester, the repeating unit of dibasic acid component preferably comprises at least one dicarboxylic acid unit selected from the group consisting of a terephthalic acid unit represented by formula (a) and a 2,6-naphthalenedicarboxylic acid unit represented by formula (b) in an amount of from 60 to 95 mol % and a sulfobenzenedicarboxylic acid unit represented by formula (c) in an amount of from 5 to 17 mol %, and the repeating unit of divalent alcohol component preferably comprises an ethylene glycol unit represented by formula (d) in an amount of from 10 to 60 mol %, a triethylene glycol unit represented by formula (e) in an amount of from 30 to 90 mol % and a bisphenol A-ethylene oxide adduct unit represented by formula (f) in an amount of from 5 to 40 mol %. The polyester having such a composition is a water-dispersible polymer. A water-dispersible polymer is a polymer which can be easily dispersed in water itself and maintain its dispersion over an extended period of time.

The foregoing repeating unit of dibasic acid component constituting the polyester may have any one of the following constitutions (1) to (3). The percent molar proportion of the repeating unit of dibasic acid component corresponds to that of the material used. Accordingly, the amount of dibasic acid to be used also indicates the percent molar proportion of acid unit hereinafter.

(1) A repeating unit of dibasic acid component comprising a terephthalic acid unit represented by formula (a), a sulfobenzenedicarboxylic acid unit represented by formula (c), and optionally an isophthalic acid unit represented by formula (g).

The amount of the terephthalic acid or alkylester thereof to be used in the production of the polyester is normally from 60 to 95 mol %, preferably from 65 to 95 mol %, particularly from 70 to 95 mol % of the total amount of dibasic acid component. The amount of the isophthalic acid or alkylester thereof to be used is preferably from 0 to 35 mol %, particularly from 0 to 25 mol % of the total amount of dibasic acid component. The alkylester of terephthalic acid and isophthalic acid is preferably in the form of lower alkylester, more preferably methylester, ethylester, isopropylester, propylester or butylester, particularly methylester.

The amount of the sulfobenzenedicarboxylic acid or alkylester or hydroxyalkylester thereof to be used is preferably from 5 to 17 mol %, particularly from 6 to 15 mol % of the total amount of dibasic acid component.

The foregoing sulfoaryldicarboxylic acid or alkylester or hydroxyalkylester thereof is represented by formula (1):

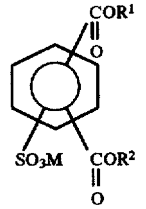

(1)

wherein $R^1$ and $R^2$ each represent a hydrogen atom, lower alkyl group or hydroxyalkyl group; and M represents a hydrogen atom or alkali metal.

$R^1$ and $R^2$ each is preferably a hydrogen atom, hydroxyethyl group, hydroxypropyl group, hydroxyisopropyl group, hydroxybutyl group, methyl group, ethyl group, isopropyl group, propyl group or butyl group, particularly hydroxyethyl group. M is preferably sodium, potassium or lithium, particularly sodium.

The foregoing sulfobenzenedicarboxylic acid or alkylester or hydroxyalkylester thereof is preferably an isophthalic acid, terephthalic acid or phthalic acid having a sulfonic acid metal salt group or lower alkylester or hydroxyalkylester thereof, particularly an isophthalic acid having a sulfonic acid metal salt group or lower alkylester or hydroxyalkylester thereof, even more preferably an isophthalic methylester or hydroxyethylester having a sulfonic acid metal salt group. If a hydroxyethylester of sulfoaryldicarboxylic acid is used as the hydroxyalkylester of sulfoaryldicarboxylic acid, a part of the hydroxyethylester takes part as an ethylene glycol, i.e., divalent alcohol component in the reaction of polyester. This can apply to hydroxypropylester, hydroxybutylester, etc.

(2) A repeating unit of dibasic acid component comprising a 2,6-naphthalenedicarboxylic acid unit represented by formula (b), a sulfobenzenedicarboxylic acid unit represented by formula (c), and optionally an isophthalic acid unit represented by formula (g).

The amount of the 2,6-naphthalenedicarboxylic acid or alkylester thereof to be used in the production of the polyester is normally from 60 to 95 mol %, preferably from 65 to 95 mol %, particularly from 70 to 95 mol % of the total amount of dibasic acid component. Preferred examples of the alkylester of the 2,6-naphthalenedicarboxylic acid include lower alkylester of 2,6-naphthalenedicarboxylic acid such as methylester, ethylester, isopropylester, propylester and butylester of 2,6-naphthalenedicarboxylic acid. Particularly preferred among these lower alkylesters is methylester. As the alkylester of 2,6-naphthalenedicarboxylic acid there may be normally used methylester of 2,6-naphthalenedicarboxylic acid. The amount and material of isophthalic acid or alkylester thereof and sulfobenzenedicarboxylic acid or alkylester or hydroxyalkylester thereof to be used are the same as in the constitution (1).

(3) A repeating unit of dibasic acid component comprising a terephthalic acid unit represented by formula (a), a 2,6-naphthalenedicarboxylic acid unit represented by formula (b), and optionally an isophthalic acid unit represented by formula (g).

The amount of the terephthalic acid or alkylester thereof (same as used in the constitution (1)) to be used in the production of the polyester is normally from 10 to 90 mol %, preferably from 20 to 80 mol %, particularly from 30 to 70 mol % of the total amount of dibasic acid component. The amount of the 2,6-naphthalenedicarboxylic acid or alkylester thereof (same as used in the constitution (2)) to be used in the production of the polyester is normally from 10 to 90 mol %, preferably from 20 to 80 mol %, particularly from 30 to 70 mol % of the total amount of dibasic acid component. The amount and material of isophthalic acid or alkylester thereof and sulfobenzenedicarboxylic acid or alkylester or hydroxyalkylester thereof to be used are the same as in the constitution (1).

The sum of the amount of the foregoing dibasic acid units accounts for at least 80 mol %, preferably at least 90 mol %, most preferably 100 mol % of the total amount of the repeating unit of dibasic acid component.

Preferred among the foregoing constitutions are the constitutions (1) and (3), particularly the constitution (3).

As dibasic acid components other than mentioned above there may be used an aromatic dicarboxylic acid such as phthalic acid and 2,7-naphthalenedicarboxylic acid, aliphatic dicarboxylic acid such as adipic acid, malonic acid, succinic acid, azelaic acid and sebacic acid, and alicyclic dicarboxylic acid such as 1,4-cyclohexanedicarboxylic acid so far as the properties of the film cannot be impaired. Further, a polybasic acid component such as trimellitic acid may be used.

As the divalent alcohols forming the foregoing repeating unit of divalent alcohol component constituting the polyester there may be used ethylene glycol, triethylene glycol and bisphenol A-ethylene oxide adduct.

The repeating unit comprises an ethylene glycol unit in an amount of from 10 to 60 mol %, a triethylene glycol unit in an amount of from 30 to 90 mol % and a bisphenol A-ethylene oxide adduct in an amount of from 5 to 40 mol %. The percent molar proportion of ethylene glycol unit is preferably from 20 to 60 mol %, more preferably from 30 to 60 mol %. The amount of ethylene glycol to be used in the production of the polyester is predetermined to more than the amount of the ethylene glycol unit as defined above taking into account the evaporation loss during the reaction and the amount arising from the foregoing hydroxyethylester of sulfoaryldicarboxylic acid.

The percent molecular proportion of the triethylene glycol unit is preferably from 30 to 80 mol %, particularly from 30 to 70 mol %. The amount of triethylene glycol to be used in the production of the polyester is predetermined to almost the same as the foregoing triethylene glycol unit.

The percent molecular proportion of the bisphenol A-ethylene oxide adduct unit is preferably from 5 to 30 mol %, particularly from 5 to 25 mol %. The amount of the bisphenol A-ethylene oxide adduct to be used in the production of the polyester is predetermined to the same as the foregoing bisphenol A-ethylene oxide adduct unit.

The sum of the amount of the foregoing ethylene glycol unit, triethylene glycol unit and bisphenol A-ethylene oxide adduct unit accounts for not less than 70 mol %, preferably not less than 80 mol %, particularly not less than 90 mol %, most preferably 100 mol % of the total amount of polyvalent alcohol unit.

The foregoing bisphenol A-ethylene oxide adduct is preferably a compound represented by formula (2):

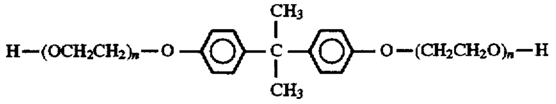
(2)

wherein n represents an integer of from 1 to 5, preferably 1 or 2.

As the polyvalent alcohol there may be used 1,4-butanediol, 1,6-hexanediol, 1,3-propanediol, 1,4-cyclohexanedimethanol, neopentyl glycol, 1,2-propylene glycol, 1,3-butylene glycol, 1,2-butylene glycol, diethylene glycol, polyethylene glycol or the like so far as the properties of the film cannot be impaired.

The foregoing polyester can be synthesized by a process which comprises allowing a dibasic acid and a divalent alcohol to undergo esterification reaction or ester interchange reaction to obtain an oligomer, and then allowing the oligomer to undergo polycondensation reaction in vacuo, as in the synthesis of ordinary polyethylene terephthalate or polyethylene-2,6-naphthalate. As described in JP-B-53-37920, the polyester can be obtained also by the depolymerization of a polyester. Referring to the dibasic acid, at least an alkylester of dicarboxylic acid such as dimethyl terephthalate, dimethyl isophthalate and dimethyl-2,6-naphthalenecarboxylate is subjected to ester interchange reaction as one of the two reactants, followed by polycondensation reaction. Alternatively, a dicarboxylic acid may be directly subjected to esterification, followed by polycondensation reaction.

For example, a dibasic acid and a divalent alcohol are allowed to undergo reaction at a temperature of from 180° C. to 280° C. and atmospheric pressure for 120 to 240 minutes until the completion of distillation of water or alcohol. The ester interchange reaction is then completed. Subsequently, the pressure in the reaction system is reduced to not lower than 1 mmHg while being heated to a temperature of from 240° C. to 290° C. Under these conditions, the reaction system is then heated to the same temperature for 60 to 180 minutes to obtain the desired polyester.

The number-average molecular weight of the foregoing polyester is preferably from 1,500 to 5,000. The weight-average molecular weight of the foregoing polyester is preferably from 2,500 to 15,000. The weight-average molecular weight/number-average molecular weight of the foregoing polyester is preferably from 1.2 to 3.0.

The image receiving layer of the present invention may comprise polymers other than the foregoing polyester incorporated therein in an amount of not more than 20% by weight. In general, polymers having a glass transition temperature of not lower than 60° C., preferably from 60° C. to 120° C., may be used. Examples of these polymers include polyester resins other than mentioned above, polyether resins, acrylic resins, epoxy resins, urethane resins, amino resins, and phenolic resins. Water-dispersible polymers are preferred.

The foregoing image receiving layer may comprise a matting agent incorporated therein. The incorporation of a matting agent can provide an enhancement of slipperiness, resulting in a good effect of improving the abrasion resistance and scratch resistance of the film.

Examples of materials to be used in the matting agent include fluororesin, and low molecular polyolefin organic polymer (e.g., polyethylene matting agent, paraffin or microcrystalline wax emulsion). Examples of materials to be used in matting agent made of nearly spherical grains include bead-like plastic powder (e.g., crosslinked PMMA, polycarbonate, polyethylene terephthalate, polyethylene, polystyrene), and inorganic particulate material (e.g., $SiO_2$, $Al_2O_3$, talc, kaolin).

The content of the foregoing matting agent is preferably from 0.1 to 10% by weight based on the weight of the polymer.

The foregoing image receiving layer preferably has a surface electrical resistivity of from $1\times10^9$ to $1\times10^{13}\Omega$ at 25° C. and 65%RH. If the surface electrical resistivity of the image receiving layer falls below $1\times10^9\Omega$, the amount of the toner to be transferred to the image receiving layer of the electrophotographic transfer film is not sufficient, resulting in the reduction of the density of the toner image thus obtained. On the contrary, if the surface electrical resistivity of the image receiving layer exceeds $1\times10^{13}\Omega$, charge is generated more than required upon transfer, preventing the toner from being sufficiently transferred to the electrophotographic transfer film and hence resulting in the reduction of the density of the toner image thus obtained. Further, when the electrophotographic transfer film is handled, the image receiving layer is electrostatically charged to attract dust, causing misfeed, double feed, discharge mark, effective toner transfer, etc.

For the purpose of adjusting the surface electrical resistivity of the image receiving layer to the above defined range, the foregoing image receiving layer may comprise a surface active agent incorporated therein. Examples of such a surface active agent include alkylbenzeneimidazole sulfonate, naphthalenesulfonate, carboxylic acid sulfonester, phosphoric acid ester, heterocyclic amine, ammonium salt, phosphonium salt, betaine amphoteric salt, and metal oxide such as ZnO, $SnO_2$, $Al_2O_3$, $In_2O_3$, MgO, BaO and $MoO_3$.

The content of the foregoing surface active agent is preferably from 0.1 to 5% by weight based on the weight of the polymer.

The image receiving layer may further comprise known materials such as colorant, ultraviolet absorbent, crosslinking agent and oxidation inhibitor incorporated therein as necessary so far as the properties of the electrophotographic transfer film of the present invention cannot be impaired.

The formation of the foregoing image receiving layer can be accomplished, e.g., by a process which comprises dissolving or dispersing the foregoing polymer, matting agent, antistatic agent, etc. in water or an organic solvent, applying the coating solution thus obtained to the foregoing transparent support, and then heating the material so that it is dried. The application of the coating solution can be accomplished by any known means such as air doctor coater, blade coater, rod coater, knife coater, squeeze coater, reverse roll coater and bar coater.

The thickness of the foregoing image receiving layer is preferably from 1 to 8 μm, particularly from 2 to 6 μm. If the thickness of the foregoing image receiving layer falls below 1 μm, the toner can hardly be embedded deeply into the image receiving layer, causing the generation of roughness at the half tone area on the surface of the toner image. On the contrary, if the thickness of the foregoing image receiving layer exceeds 8 μm, cohesive failure can easily occur in the image receiving layer during fixing, causing offset phenomenon.

The image receiving layer of the present invention preferably has a contact angle of not more than 50 degrees, particularly not more than 45 degrees with the toner to be fixed (comprising a colorant and a binder resin or a magnetic powder and a binder resin) at the fixing temperature of the toner. The method for the measurement of contact angle will be described later.

The foregoing electrophotographic transfer film comprises an image receiving layer provided on a transparent support. If the desired surface electrical resistivity cannot be provided even by the incorporation of the foregoing surface active agent, the electrophotographic transfer film may further comprise other antistatic agents incorporated therein or may comprise an electrically-conductive undercoating layer provided interposed between the transparent support and the image receiving layer. In order to efficiently accomplish the effect of the present invention, the provision of an electrically-conductive undercoating layer is preferably employed to obtain the desired surface electrical resistivity.

The foregoing electrically-conductive undercoating layer comprises a particulate electrically-conductive metal oxide dispersed therein. Examples of the particulate electrically-conductive metal oxide include ZnO, TiO, $SnO_2$, $Al_2O_3$, $In_2O_3$, MgO, BaO and $MoO_3$. These metal oxides may be used singly or in combination (composite oxide). These metal oxides may further comprise different elements incorporated therein. For example, ZnO may be doped with Al, In or the like. TiO may be doped with Nb, Ta or the like. $SnO_2$ may be doped with Sb, Nb, halogen atom or the like. Particularly preferred among these combinations is $SnO_2$ doped with Sb. The grain diameter of the particulate electrically-conductive metal is preferably not more than 0.2 μm.

Examples of the binder material to be incorporated in the foregoing electrically-conductive undercoating layer include water-soluble polymers such as polyvinyl alcohol, polyacrylic acid, polyacrylamide, polyhydroxyethyl acrylate, polyvinyl pyrrolidone, water-soluble polyester, water-soluble polyurethane, water-soluble nylon, water-soluble epoxy resin, gelatin, hydroxyethyl cellulose, hydroxypropyl cellulose, carboxymethyl cellulose and derivative thereof, water-dispersed resins such as water-dispersed acrylic resin and water-dispersed polyester, emulsions such as acrylic resin emulsion, polyvinyl acetate emulsion and SBR (styrene-butadiene rubber) emulsion, and organic solvent-soluble resins such as acrylic resin and polyester resin. Preferred among these binder materials are water-soluble polymers, water-dispersed resins and emulsions. These polymers may further comprise the foregoing surface active agent or a crosslinking agent or the like incorporated therein.

The formation of the electrically-conductive undercoating layer can be accomplished in the same manner as the foregoing image receiving layer.

The color image formation process according to the present invention will be described hereinafter.

The toner for use in an indirect dry full color electrophotographic copying machine must exhibit an excellent meltability and color mixing property when heated. Thus, a sharp-melting toner is preferably used. The binder resin to be incorporated in the toner is preferably a polyester resin taking into account the relationship of the electrophotographic transfer film with the image receiving layer.

The production of the toner can be accomplished, e.g., by a process which comprises melt-kneading toner-forming materials, including a binder resin such as polyester, a colorant (dye, pigment) and a charge controller, crushing the mixture, and then classifying the grains.

The color image formation process will be further described hereinafter.

Figure 7:
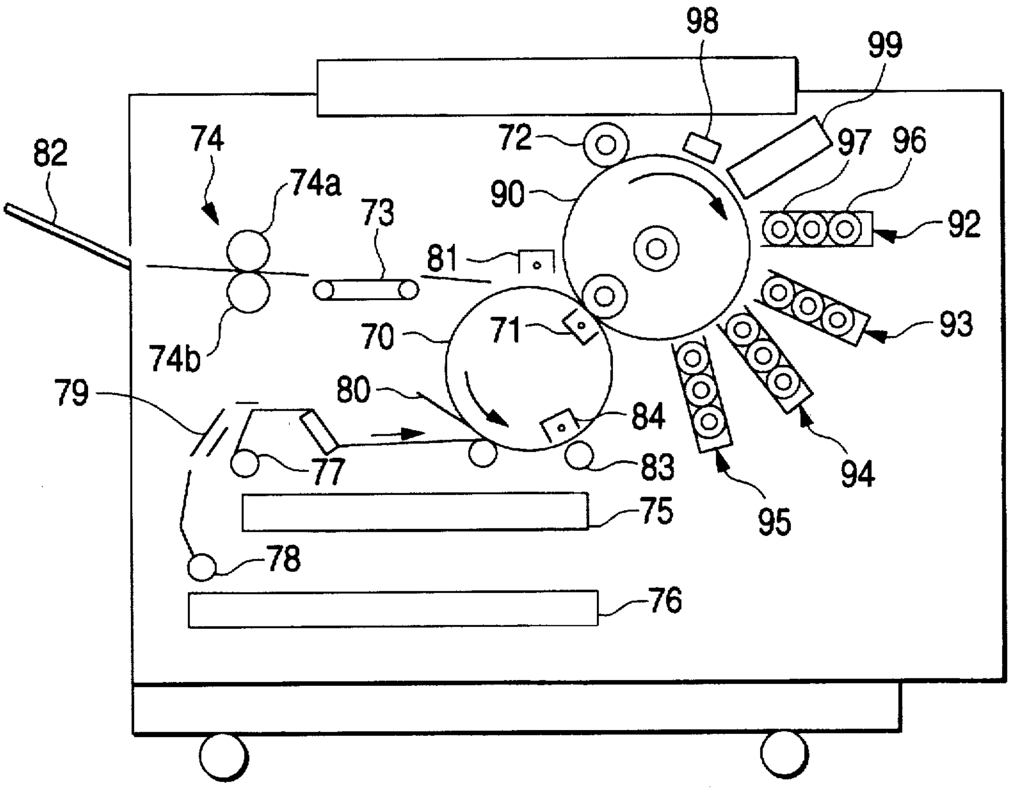
FIG. 7 is a specific sectional view illustrating an example of an electrophotographic copying machine which can be used in the present invention to form a full color image, wherein the reference numerals 11, 21 and 31 indicate a transparent support, the reference numerals 12, 22*a*, 22*b*, 32*a*, 32*b* indicate an image receiving layer, the reference numerals 33*a*, 33*b* indicate an electrically-conductive undercoating layer, the reference numeral 70 indicates a transfer drum, the reference numeral 71 indicates a transfer apparatus, the reference numeral 73 indicates a carrying apparatus, the reference numeral 74 indicates a fixing apparatus, the reference numeral 74*a* indicates a heat roll, the reference numeral 74*b* indicates a pressure roll, the reference numerals 75, 76 indicate a feed tray, the reference numerals 77, 78 indicate a feed roller, the reference numerals 79, 80 indicate a feed guide, the reference numeral 81 indicates a transfer material separation charger, the reference numeral 82 indicates a output tray, the reference numeral 83 indicates a contact roller, the reference numeral 84 indicates an electrode, the reference numeral 90 indicates an electrostatic latent image carrier (photoreceptor drum), the reference numeral 92 indicates a black developing machine, the reference numeral 93 indicates a magenta developing machine, the reference numeral 94 indicates a cyan developing machine, the reference numeral 95 indicates a yellow developing machine, the reference numeral 96 indicates a housing, the reference numeral 97 indicates a developer retainer, the reference numeral 98 indicates a charger, and the reference numeral 99 indicates a writing apparatus.

FIG. 7 is a schematic sectional view illustrating an example of an electrophotographic copying machine (apparatus) which can be used in the present invention to form a full color image. The electrophotographic copying machine roughly comprises a transfer material carrying system disposed over the zone extending from the bottom of the main body of the copying machine to the vicinity of the center of the main body of the copying machine, a latent image forming zone disposed close to a transfer drum 70 constituting the transfer material carrying system in the vicinity of the center of the main body, and a developing apparatus disposed close to the latent image forming zone.

In the transfer material carrying system are provided feed trays 75 and 76 disposed at the bottom of the main body of the copying machine, feed rollers 77 and 78 disposed nearly above these trays, and feed guides 79 and 80 disposed close to these feed rollers. In the transfer material carrying system are also provided a transfer drum 70 which can freely rotate in the direction of the arrow and comprises a transfer apparatus 71 and an electrode 84 provided on the inner side thereof, a transfer material separation charger 81 disposed in the vicinity of the periphery of the transfer drum 70, a contact roller 83 disposed in contact with the periphery of the transfer drum 70, a carrying apparatus 73, a fixing apparatus 74 disposed close to the rear end of the carrying apparatus 73, and a removable output tray 82.

In the latent image forming zone are provided an electrostatic latent image carrier (photoreceptor drum) 90 disposed in contact with the periphery of the transfer drum 70 at its periphery which can freely rotate in the direction of the arrow, a charger 98 disposed in the vicinity of the periphery of the electrostatic latent image carrier, a writing apparatus 99 comprising an imagewise exposing means such as laser beam scanner for forming an electrostatic latent image on the periphery of the electrostatic latent image carrier and an imagewise exposure reflecting means such as polygon mirror, and a cleaning apparatus 72.

The developing apparatus consists of a black developing machine 92, a magenta developing machine 93, a cyan developing machine 94 and a yellow developing machine 95 disposed opposed to the periphery of the electrostatic latent image carrier 90 for visualizing (i.e., developing) the electrostatic latent image formed on the periphery of the electrostatic latent image carrier 90. These developing machines each comprise a developer retainer 97 and a housing 96.

The sequence of the image formation by an electrophotographic apparatus having the foregoing configuration will be described hereinafter with reference to a full color mode. When the foregoing electrostatic latent image carrier 90 rotates in the direction of the arrow, the surface of the electrostatic latent image carrier is uniformly charged by the charger 98. The electrostatic latent image carrier thus uniformly charged is then scanned by laser which has been modulated by a black image signal from the original (not shown) through the writing apparatus 99 to form an electrostatic latent image thereon. The electrostatic latent image thus formed on the electrostatic latent image carrier 90 is then developed by the black developing machine 92.

On the other hand, a transfer material (electrophotographic transfer film) which has been transferred from the feed trays 75 or 76 through the feed roller 77 or 78 and the feed guide 79 or 80 is then wound on the transfer drum 70 with the aid of electrostatic force provided by the electrode 84 disposed opposed to the contact roller 83. The transfer drum 70 rotates in the direction of the arrow synchronously with the electrostatic latent image carrier 90. The image thus developed by the black developing machine 92 (unfixed toner image) is then transferred to the transfer material by the transfer apparatus 71 at the position where the periphery of the electrostatic latent image carrier 90 and the periphery of the transfer drum 70 come into contact with each other. The transfer drum 70 continues to rotate to prepare for the subsequent transfer of the next color (magenta in FIG. 7).

On the other hand, the electrostatic latent image carrier 90 is destaticized by a destaticizing charger (not shown), cleaned by the cleaning apparatus 72, and then again charged by the charger 98. The electrostatic latent image carrier 90 thus charged is then scanned by a light of latent image generated by the next magenta image signal. The electrostatic latent image thus formed by the imagewise exposure to light generated by the next magenta image signal is then developed by the magenta developing machine 93 to form a developed image. Subsequently, the foregoing process is repeated for cyan and yellow. When the transfer of the four colors is thus completed, the transfer material on which the developed multi-color image has been formed is destaticized by the charger 81, and then transferred by the paper carrying apparatus 73 to the fixing apparatus 74 where it is fixed by the action of heat and pressure. Thus, a sequence of the formation of a full color image is completed.

The foregoing fixing apparatus 74 comprises as essential parts a heat roll 74*a* and a pressure roll 74*b* having the same structure. Inside the heat roll 74*a* is provided a 500-W Quartz lamp. The heat roll 74*a* comprises a substrate roll having an outer diameter made of a steel core having an outer diameter of 44 mmϕ and a fluororubber (e.g., Viton rubber, available from Du Pont) having a rubber hardness of 60° C. in accordance with JIS and a thickness of 40 μm provided on the substrate roll through a proper primer. On the other hand, the pressure roll 74*b* has the same structure as the heat roll 74*a* except that it comprises a substrate roll made of a steel core having an outer diameter of 48 mmϕ and an inner elastic layer having a thickness of 1 mm made of a silicone rubber provided on the substrate roll.

As a releaser supplying means for supplying a releaser made of a dimethylpolysiloxane containing a functional group (e.g., amino group), an oil donor roll made of a silicone rubber comes into contact with the foregoing heat roll to render the surface of the fluororubber layer highly releasing. The oil donor roll is arranged such that it is supplied with a releaser from an oil pickup roll dipped in an oil pan.

The heat roll 74*a* and the pressure roll 74*b* are brought into contact with each other under pressure by a pressure mechanism to form a nip of 6 mm therebetween. Further, both the two rolls are arranged to have a surface temperature of 150° C. and rotate at a surface speed of 60 mm/sec in the direction of the arrow.

However, the indirect dry full color electrophotographic copying machine employable herein is not limited to the mechanism shown above (FIG. 7). An alternate for the foregoing mechanism is an indirect dry full color electrophotographic copying machine which operates to subsequently develop electrostatic latent images corresponding to various colors have been subsequently formed on an image carrier with various color toners, sequentially transfer these developed images to a belt-like intermediate transfer material with the aid of electrostatic force in a primary transfer step so that these developed images are superposed on each other, and then transfer the toner images thus overlapped on the intermediate transfer material to a recording medium with the aid of a bias transfer roll to which a transferring voltage having a polarity opposite that of the charge of the toner has been applied in a secondary transfer step to form a color image. Another alternate is an indirect dry full color electrophotographic apparatus which operates to repeat a developing step by a plurality of developing machines to form a multi-color image on an image carrier, and then collectively transfer the multi-color image to a recording plate to form a full color image. A further alternate is an indirect dry full color electrophotographic copying machine comprising a plurality of juxtaposed image carriers which operates to subsequently transfer the image formed on various carriers to a recording medium being carried over a transfer belt to form a full color image.

The present invention will be further described in the following synthesis examples and examples, but the present invention should not be construed as being limited thereto.

SYNTHESIS EXAMPLE 1

484 parts (2.495 molar parts) of dimethyl terephthalate, 609 parts (2.496 molar parts) of dimethyl-2,6-naphthalenedicarboxylate and 110 parts (0.567 molar parts) of dimethyl isophthalate as dibasic acid components, 552 parts (8.903 molar parts) of ethylene glycol, 501 parts (3.340 molar parts) of triethylene glycol and 176 parts (0.557 molar parts) of bisphenol A-ethylene oxide adduct (compound represented by formula (2) wherein n is 1; NC-1900, available from Nihon Nyukazai K.K.) as divalent alcohols, 0.33 parts of manganese dioxide tetrahydrate as an ester interchange catalyst, and 0.37 parts of antimony trioxide as a polycondensation catalyst were charged into a reaction tank equipped with a heating medium heating jacket, an agitator and a fractionating column. The reaction system was then gradually heated while being aerated with nitrogen. Under these conditions, the reaction system was allowed to undergo ester interchange reaction at a temperature of from 150° C. to 250° C. while methanol secondarily produced was being removed from the fractionating column.

After the completion of distillation of methanol was confirmed, the resulting oligomer was then transferred to a 250° C. polycondensation reaction tank equipped with a heating medium heating jacket, an agitator for agitating a high viscosity material and a vacuum pump. Into the reaction were further charged 498 parts of a 40 wt-% ethylene glycol (EG) solution of an ethylene glycol ester of 5-sodiumsulfoisophthalic acid (dihydroxyethyl 5-sodiumsulfoisophthalate; SSIA) (SSIA: 0.560 molar parts; EG: 4.823 molar parts; SIPE-40, available from Sanyo Chemical Industries, Ltd.). The pressure in the reaction system was then reduced to 1 mmHg in 60 minutes. During this process, the reaction temperature was gradually raised. Eventually, the reaction temperature reached 260° C.

The melt viscosity of the reaction product was measured by means of a torquemeter mounted on the shaft of agitator. When the reaction product showed a melt viscosity of 150 poise at 260° C., nitrogen was introduced into the reaction system to return the pressure therein to the atmosphere, suspending the polycondensation reaction. The resulting resin was withdrawn to obtain a polyester.

The composition of the polyester thus obtained is set forth in Table 1.

SYNTHESIS EXAMPLE 2

594 parts (3.062 molar parts) of dimethyl terephthalate and 609 parts (2.496 molar parts) of dimethyl-2,6-naphthalenedicarboxylate as dibasic acid components, 552 parts (8.903 molar parts) of ethylene glycol, 501 parts (3.340 molar parts) of triethylene glycol and 176 parts (0.557 molar parts) of bisphenol A-ethylene oxide adduct (compound represented by formula (2) wherein n is 1; NC-1900, available from Nihon Nyukazai K.K.) as divalent alcohols, 0.33 parts of manganese dioxide tetrahydrate as an ester interchange catalyst, and 0.37 parts of antimony trioxide as a polycondensation catalyst were charged into a reaction tank equipped with a heating medium heating jacket, an agitator and a fractionating column. The reaction system was then gradually heated while being aerated with nitrogen. Under these conditions, the reaction system was allowed to undergo ester interchange reaction at a temperature of from 150° C. to 250° C. while methanol secondarily produced was being removed from the fractionating column.

After the completion of distillation of methanol was confirmed, the resulting oligomer was then transferred to a 250° C. polycondensation reaction tank equipped with a heating medium heating jacket, an agitator for agitating a high viscosity material and a vacuum pump. Into the reaction were further charged 498 parts of a 40 wt-% ethylene glycol (EG) solution of an ethylene glycol ester of 5-sodiumsulfoisophthalic acid (dihydroxyethyl 5-sodiumsulfoisophthalate; SSIA) (SSIA: 0.560 molar parts; EG: 4.819 molar parts; SIPE-40, available from Sanyo Chemical Industries, Ltd.). The pressure in the reaction system was then reduced to 1 mmHg in 60 minutes. During this process, the reaction temperature was gradually raised. Eventually, the reaction temperature reached 260° C.

The melt viscosity of the reaction product was measured by means of a torquemeter mounted on the shaft of agitator. When the reaction product showed a melt viscosity of 120 poise at 260° C., nitrogen was introduced into the reaction system to return the pressure therein to the atmosphere, suspending the polycondensation reaction. The resulting resin was withdrawn to obtain a polyester.

The composition of the polyester thus obtained is set forth in Table 1.

SYNTHESIS EXAMPLE 3

836 parts (5.036 molar parts) of terephthalic acid and 93 parts (0.560 molar parts) of isophthalic acid as dibasic acid components, 552 parts (8.903 molar parts) of ethylene glycol, 501 parts (3.340 molar parts) of triethylene glycol and 176 parts (0.557 molar parts) of bisphenol A-ethylene oxide adduct (compound represented by formula (2) wherein n is 1; NC-1900, available from Nihon Nyukazai K.K.) as divalent alcohols and 0.37 parts of antimony trioxide as a polycondensation catalyst were charged into a reaction tank equipped with a heating medium heating jacket, an agitator and a fractionating column. The reaction system was then gradually heated while being aerated with nitrogen. Under these conditions, the reaction system was heated to a temperature of 250° C. while the resulting water was being removed. The reaction was completed when the reaction solution assumed transparent.

The resulting oligomer was then transferred to a 250° C. polycondensation reaction tank equipped with a heating medium heating jacket, an agitator for agitating a high viscosity material and a vacuum pump. Into the reaction were further charged 498 parts of a 40 wt-% ethylene glycol (EG) solution of an ethylene glycol ester of 5-sodiumsulfoisophthalic acid (dihydroxyethyl 5-sodiumsulfoisophthalate; SSIA) (SSIA: 0.560 molar parts; EG: 4.823 molar parts; SIPE-40, available from Sanyo Chemical Industries, Ltd.). After 5 minutes, to the reaction system were then added 0.37 parts of trimethyl phosphate as a thermal stabilizer. The mixture was then stirred for 2 minutes. The pressure in the reaction system was then reduced to 1 mmHg in 60 minutes. During this process, the reaction temperature was gradually raised. Eventually, the reaction temperature reached 260° C.

The melt viscosity of the reaction product was measured by means of a torquemeter mounted on the shaft of agitator. When the reaction product showed a melt viscosity of 120 poise at 265° C., nitrogen was introduced into the reaction system to return the pressure therein to the atmosphere, suspending the polycondensation reaction. The resulting resin was withdrawn to obtain a polyester.

EXAMPLE 1

A 100-μm thick polyethylene terephthalate film which had been thermally fixed by biaxial orientation was subjected to corona discharge treatment. An electrically-conductive undercoating layer-forming coating solution having the following composition and an image receiving layer-forming coating solution having the following composition were prepared. (The weight part of the components of the coating solutions are as calculated in terms of solid content or nonvolatile content)

Electrically-conductive undercoating layer-forming coating solution

| | |
|---|---|
| Water-soluble acrylic resin (Jurymer ET-410, available from Nihon Junyaku K.K.) | 1.55 parts by weight |
| Tin dioxide (SN-88; average grain diameter: 88 nm; available from Ishihara Sangyo Kaisha Ltd.) | 1.80 parts by weight |
| Nonionic surface active agent (EMALEX/NP8.5; available from Nihon Emulsion K.K.) | 0.125 parts by weight |
| Purified water | 96.4 parts by weight |

The foregoing electrically-conductive undercoating layer-forming coating solution was applied to one side of the foregoing polyethylene terephthalate film at a coating rate of 105 m/min by means of a bar coater #2.4, and then dried at a temperature of 120° C. for 1 minute. The electrically-conductive undercoating layer-forming coating solution was further applied to the other side of the film, and then dried in the same manner as mentioned above to form an electrically-conductive undercoating layer thereon. Thus, an electrically-conductive undercoating layer was formed on both sides of the film. The thickness of the electrically-conductive undercoating layer was 0.15 μm.

Image receiving layer-forming coating solution

| | |
|---|---|
| Water dispersion of polyester resin obtained in Synthesis Example 1* (solid content: 20% by weight) | 75 parts by weight |
| Crosslinked PMMA matting agent (MR-7G; average grain diameter: 7 μm, available from Soken Kagaku K.K.) | 0.075 parts by weight |
| Purified water | 25 parts by weight |

*Preparation of water dispersion of polyester resin obtained in Synthesis Example 1

200 g of the polyester obtained in Synthesis Example 1 was put into 800 g of distilled water which had been heated to a temperature of 90° C. while the latter was being stirred by a disper at 1,000 rpm. The mixture was then kept being stirred at the same temperature for 3 hours to obtain a water dispersion of polyester resin.

The foregoing image receiving layer-forming coating solution was applied to one of the two electrically-conductive undercoating layers at a coating rate of 105 m/min by means of a bar coater #12, and then dried at a temperature of 120° C. for 1 minute. The image receiving layer-forming coating solution was further applied to the other electrically-conductive undercoating layer, and then dried in the same manner as mentioned above to form an image receiving layer. Thus, an image receiving layer was formed on both sides of the film. The thickness of the image receiving layer was 3.0 μm.

Thus, an electrophotographic transfer film comprising an image receiving layer formed on both sides of a polyethylene terephthalate film was formed.

EXAMPLE 2

The procedure of Example 1 was followed to prepare an electrophotographic transfer film except that a water dispersion of the polyester resin obtained in Synthesis Example 2 was used instead of the water dispersion of the polyester resin obtained in Synthesis Example 1 to prepare the image receiving layer-forming coating solution.

EXAMPLE 3

The procedure of Example 1 was followed to prepare an electrophotographic transfer film except that a water dispersion of the polyester resin obtained in Synthesis Example 3 was used instead of the water dispersion of the polyester resin obtained in Synthesis Example 1 to prepare the image receiving layer-forming coating solution.

COMPARATIVE EXAMPLE 1

The procedure of Example 1 was followed to prepare an electrophotographic transfer film except that a water dispersion of the polyester resin having the composition set forth in the column of Comparative Example 1 in Table 1 was used instead of the water dispersion of the polyester resin obtained in Synthesis Example 1 to prepare the image receiving layer-forming coating solution.

Composition of polyester

The composition of the polyesters obtained in Synthesis Examples 1 to 3 were determined from measurements obtained by a proton process NMR.

Number-average molecular weight and weight-average molecular weight

The foregoing number-average molecular weight and weight-average molecular weight of these polyester compositions were measured as follows.

Gel permeation chromatography (SCL-6B, available from Shimadzu Corp.) was employed. As GPC column there was used Shodex-KF804. The measurement was effected at a temperature of 40° C. Under these conditions, 15 μl of a sample having a concentration of 8 mg/ml (sample)/20 ml (tetrahydrofuran) was poured into the measurement system while a solvent (tetrahydrofuran) was being allowed to flow at a rate of 0.8 ml/min. As a reference substance there was used a polystyrene.

The results of measurements and the composition and molecular weight of the polyester used in Comparative Example 1 are set forth in Table 1.

TABLE 1

| Example No. | Polyester composition (mol %) TP | IP | NDC | SSIA | EG | TEG | BA | Number-average molecular weight (Mn) | Weight-average molecular weight (Mw) | (mw/Mn) |
|---|---|---|---|---|---|---|---|---|---|---|
| Example 1 | 40.9 | 9.1 | 40.9 | 9.1 | 46.0 | 46.0 | 8.0 | 2,240 | 3,750 | 1.67 |
| Example 2 | 50.0 | — | 40.9 | 9.1 | 46.0 | 46.0 | 8.0 | 2,370 | 3,980 | 1.68 |
| Example 3 | 81.8 | 9.1 | — | 9.1 | 46.0 | 46.0 | 8.0 | 3,510 | 6,390 | 1.82 |
| Comparative Example 1 | 81.8 | — | — | 18.2 | 50.0 | 50.0 | — | 6,330 | 19,710 | 3.11 |

Remarks)
TP: Terephthalic acid unit represented by formula (a)
IP: Isophthalic acid unit represented by formula (b)
NDC: Naphthalenedicarboxylic acid unit represented by formula (c)
SSIA: Sulfobenzenedicarboxylic acid unit represented by formula (d)
EG: Ethylene glycol unit represented by formula (e)
TEG: Triethylene glycol unit represented by formula (f)
BA: Bisphenol A-ethylene oxide adduct unit represented by formula (g)

The electrophotographic transfer films thus obtained were each evaluated for properties in the following manner.

1) Preparation of toner

To 96 parts by weight of a polyester resin (weight-average molecular weight: 11,000; number-average molecular weight/weight-average molecular weight: 2.9) were added 1 part by weight of a charge controller and 3 parts by weight of a cyan pigment. The mixture was then stirred to prepare a cyan toner. Similarly, to 96 parts by weight of the polyester resin were added 1 part by weight of the charge controller and 3 parts by weight of a magenta pigment to prepare a magenta toner. Similarly, 3 parts by weight of a yellow pigment were used instead of 3 parts by weight of the magenta pigment to prepare a yellow toner. Further, 3 parts by weight of a black pigment were used instead of 3 parts by weight of the magenta pigment to prepare a black toner. All these toners exhibited a volume-average grain diameter of 7 μm.

For the measurement of the volume-average grain diameter of these toners, a Type TA-II coal tar counter (available from Coat Tar Corp.) was used. The grain size distribution of grains having a grain diameter of from 2 to 50 μm was measured through a 100 μm aperture to determine the volume-average grain diameter of these toners.

2) Angle of inclination of toner (degree)

The toners thus obtained were each measured for angle of inclination in accordance with the following measuring method.

(1) Disc formation of toner or toner binder

Figure 4:
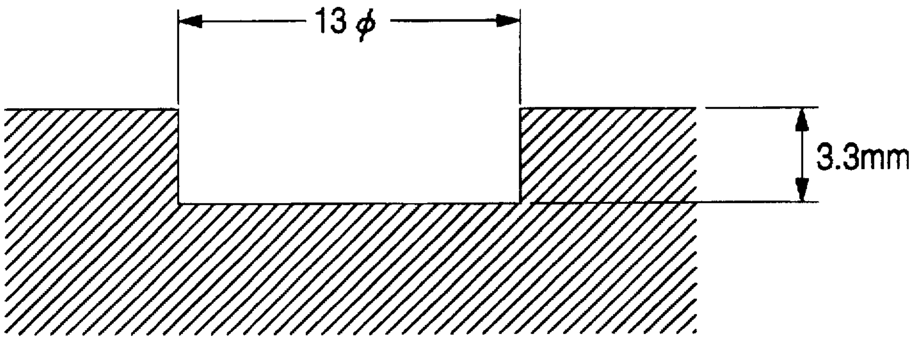
FIG. 4 is a sectional view illustrating a typical tablet mold for use in the preparation of a specimen (toner disc) to be measured for the contact angle between the image receiving layer of the electrophotographic transfer film according to the present invention and the toner.
Figure 5:
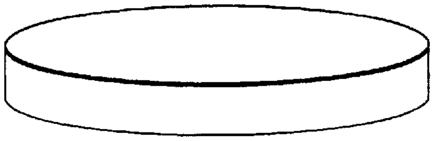
FIG. 5 is a perspective view illustrating the shape of a toner disc prepared by the tablet mold.

A tablet mold (Type SSP-10 handpress, available from Shimadzu Corp.) was filled with a toner itself, if it is a nonmagnetic binary toner, or a binder resin, if the toner is a unitary magnetic toner, at a concave having a diameter of 13 mm and a height of 3.3 mm as shown in FIG. 4. The content of the concave was then compressed under a load of 1 ton by a handpress for 1 minute to form a disc as shown in FIG. 5.

The disc was prepared in such an arrangement that it had a diameter of 13 mm, a thickness of 1.2 mm and a weight of 183 mg.

(2) Melting and hardening of disc

Figure 6:
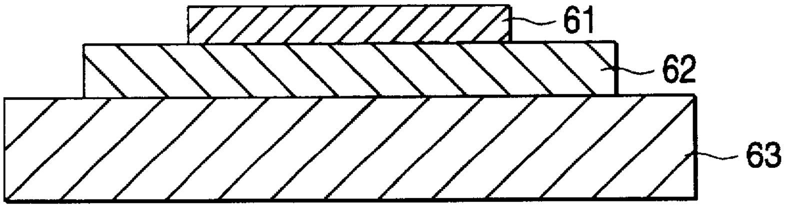
FIG. 6 is a sectional view typically illustrating how the toner disc is placed on an aluminum plate so that it is rapidly cooled and hardened.

As shown in FIG. 6, the foregoing disc 63 was placed on the electrophotographic transfer film 62. The toner disc was then heated for 90 seconds so that it was melted. (Since the electrophotographic transfer film is heated to a temperature of about 20° C. lower than that of the fixing apparatus when passing through the fixing apparatus, the melting temperature is predetermined to −20° C. lower than the temperature of the fixing apparatus.) This laminate was then placed on an aluminum plate 61 having a thickness of 1 mm, a length of 420 mm and a width of 297 mm for 1 minute so that it was rapidly cooled and hardened.

(3) Measurement of contact angle of toner

Using a contact angle measuring apparatus (available from Kyowa Kaimen Kagaku K.K.), the angle made by the tangent line on the toner at the point of its contact with the electrophotographic transfer film on which it had been hardened and the surface of the film was measured at both the right and left sides. The measurements were then averaged to obtain the contact angle of molten toner.

3) PE (specular transmittance)

With the electrophotographic transfer films obtained in the foregoing examples and comparative example and the toners obtained as mentioned above, an indirect dry full color electrophotographic copying machine as shown in FIG. 7 was adjusted in such an arrangement that the toners are attached to the transfer film having an input dot area ratio of 100% in an amount of 1.0 mg/cm$^2$ for black and 0.65 mg/cm$^2$ for yellow, magenta and cyan, respectively. Patches of yellow, magenta and cyan toners having an input dot area ratio of 100% and 36% were outputted as unfixed images. These unfixed images were then heated under pressure at a heat fixing roll temperature of 150° C. for an average heating time of 100 msec. so that they were fixed to form a full color fixed image on the transfer film. Each of the fixed images formed on the film having an input dot area ratio of 100% (Cin 100%) or 36% (Cin 36%) was evaluated by measuring the specular transmittance (projection efficiency (hereinafter referred to as "PE")). Since similar results were obtained with the various colors, only the results with yellow are set forth in Table 2.

For the measurement of specular transmittance PE, a spectrophotometer employing 2° field as a color matching function, A-light source as a reference light and an integrating sphere having an aperture having a viewing angle of 7° was used. Under these conditions, the specular transmittance and diffused transmittance of the fixed image were measured. PE was then determined by the following equation:

$$PE=\log[\Sigma\{P(\lambda)+N(\lambda)\}/n]/\log\{\Sigma P(\lambda)/n\}$$

wherein λ represents the wavelength of light; P(λ) represents the specular transmittance of light at the wavelength λ; N(λ) represents the diffused transmittance at the wavelength λ; and n represents the sampled number in the visible light range.

In other words, the more PE is, the more is the specularly transmitted light component, i.e., the sharper is the image projected by OHP. Referring to the relationship between % PE value and the visual evaluation of projected area, it was found that when the percent PE value is not less than 75%, the resulting projected area gives an excellent color reproduction.

4) Offset

In the foregoing measurement (3), the generation of offset was observed. The results were evaluated as follows.

AA: No offset observed

BB: Fixing image (image receiving layer) observed slightly floated

CC: Image receiving layer observed transferred to fixing roll

5) Surface electrical resistivity (Ω)

Using an electrical resistance meter (TR-8601, available from Advantest Co., Ltd.), the measurement was effected at 25° C. and 65%RH.

6) Toner transferability 10 sheets of the copied films thus obtained were measured for optical density at the area of 100% dot area ratio (Cin 100%) of yellow (Y), magenta (M), cyan (C) and black (K) by means of an optical densitometer (X-Rite 310TR, available from X-Rite Corp.). Thus, the degree of transfer of toner image was evaluated. This value is preferably higher.

The results of measurement are set forth in Table 2.

TABLE 2

| Evaluation | Example 1 | Example 2 | Example 3 | Comparative Example 1 |
|---|---|---|---|---|
| Angle of inclination of toner (°) | 38 | 36 | 33 | 55 |
| % PE | | | | |
| Yellow toner, Cin 100% area | 86.9 | 85.3 | 78.8 | 73.1 |
| Yellow toner, Cin 36% area | 82.4 | 81.7 | 76.5 | 67.3 |
| Offset | AA | AA | AA–BB | BB |
| Surface electrical resistivity (Ω) | $1 \times 10^{11}$ | $5 \times 10^{10}$ | $7 \times 10^{10}$ | $5.5 \times 10^{10}$ |
| Toner transfer density | | | | |
| Y | 1.26 | 1.25 | 1.21 | 1.21 |
| M | 1.25 | 1.27 | 1.28 | 1.26 |
| C | 1.08 | 1.03 | 1.01 | 1.02 |
| K | 1.10 | 1.12 | 1.13 | 1.08 |

The electrophotographic transfer film according to the present invention comprises an image receiving layer made of a novel polyester resin having a specific composition. This polyester softens so properly at the fixing temperature of the toner that the toner can be embedded in the image receiving layer. Further, the angle of inclination of the surface of the image receiving layer to the toner is normally so small that a fixed image with little roughness can be obtained. Moreover, the use of the foregoing polyester causes the toner and the image receiving layer (polyester) to be compatibilized with each other at their interface, resulting in the production of little interface therebetween. This causes little or no refraction of light from the overhead projector, making it possible to obtain an image that gives a stainless projected image having an excellent color development. Accordingly, the electrophotographic transfer film according to the present invention can provide improvements in the color development at the half tone area of a projected image and the anti-offset properties. Further, the electrophotographic transfer film according to the present invention can be advantageously used in a process for the formation of a color image thereon using an electrophotographic copying machine. It goes without saying that the electrophotographic transfer film according to the present invention can be also used as a monochromatic electrophotographic transfer film.

Moreover, the foregoing polyester resin can be easily dispersed in water. Further, since the resulting water dispersion is so stable that it can be applied as it is to form an image receiving layer, it is advantageous in that an image receiving layer can be formed without taking into account possible environmental pollution. Moreover, the foregoing water dispersion of polyester resin can hardly condense and thus little clogs the pump, coating machine and other apparatus used in the foregoing coating step.

While the invention has been described in detail and with reference to specific embodiments thereof, it will be apparent to one skilled in the art that various changes and modifications can be made therein without departing from the spirit and scope thereof.

What is claimed is:

1. A process for forming a color image on an electrophotographic transfer film, which comprises the steps:

(1) imagewise exposing a surface of a photoreceptor to light to form a latent image;

(2) developing the latent image with one of two or more toners for forming a color image, to form an image on the surface of the photoreceptor;

(3) transferring the image to an image receiving layer of the electrophotographic transfer film;

(4) repeating the steps of (1) to (3) by the number of the two or more toners to transfer a color image to the electrophotographic transfer film; and (5) pressing the transferred color image with a heat roll heated to a fixing temperature of the two or more toners to form a fixed color image on the electrophotographic transfer film;

wherein the electrophotographic transfer film comprises a transparent substrate having provided on at least one side thereof the image receiving layer comprising a polyester including a repeating unit of a dibasic acid component and a repeating unit of a divalent alcohol component, wherein the repeating unit of the dibasic acid component comprises:

at least one dicarboxylic acid unit selected from the group consisting of a telephthalic acid unit represented by formula (a) and a 2,6-naphthalenedicarboxylic acid unit represented by formula (b); and a sulfobenzenedicarboxylic acid unit represented by formula (c):

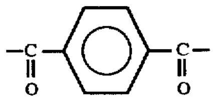

(a)

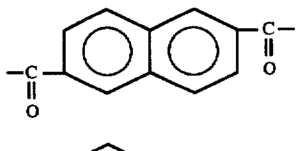

(b)

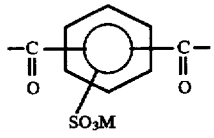

(c)

wherein M is a hydrogen atom or an alkali metal, wherein the repeating unit of the divalent alcohol component comprises an ethylene glycol unit represented by formula (d), a triethylene glycol unit represented by formula (e) and a bisphenol A-ethylene oxide adduct unit represented by formula (f):

$-O-CH_2CH_2O-$ (d)

$-O-(CH_2CH_2O)_3-$ (e)

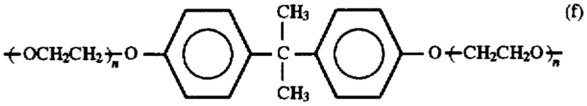

(f)

wherein n represents an integer of from 1 to 5.

2. An electrophotographic transfer film comprising a transparent substrate having provided on at least one side thereof an image receiving layer comprising a polyester including a repeating unit of a dibasic acid component and a repeating unit of a divalent alcohol component, wherein the repeating unit of the dibasic acid component comprises:

at least one dicarboxylic acid unit selected from the group consisting of a telephthalic acid unit represented by formula (a) and a 2,6-naphthalenedicarboxylic acid unit represented by formula (b); and a sulfobenzenedicarboxylic acid unit represented by formula (c):

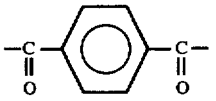

(a)

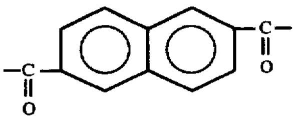

(b)

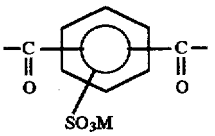

(c)

wherein M is a hydrogen atom or an alkali metal, wherein the repeating unit of the divalent alcohol component comprises an ethylene glycol unit represented by formula (d), a triethylene glycol unit represented by formula (e) and a bisphenol A-ethylene oxide adduct unit represented by formula (f):

$-O-CH_2CH_2O-$ (d)

$-O-(CH_2CH_2O)_3-$ (e)

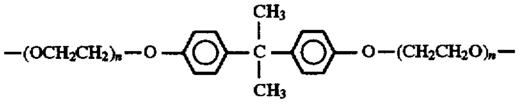

(f)

wherein n represents an integer of from 1 to 5.

3. The electrophotographic transfer film according to claim 2, wherein the repeating unit of the dibasic acid component comprises the at least one dicarboxylic acid unit in an amount of 60 to 95 mol % and the sulfobenzenedicarboxylic acid unit represented by formula (c) in an amount of 5 to 17 mol %, and the repeating unit of the divalent alcohol component comprises the ethylene glycol unit represented by formula (d) in amount of 10 to 60 mol %, the triethylene glycol unit represented by formula (e) in an amount of 30 to 90 mol % and the bisphenol A-ethylene oxide adduct unit represented by formula (f) in an amount of 5 to 40 mol %.

4. The electrophotographic transfer film according to claim 2, wherein the image receiving layer further comprises a surface active agent and a matting agent, and has a surface electrical resistance of from $1\times10^9$ to $1\times10^{13}$ Ω at 25° C. and 65% RH.

5. The electrophotographic transfer film according to claim 2, wherein the repeating unit of the dibasic acid component comprises the telephthalic acid unit represented by formula (a) in an amount of 60 to 95 mol %, an isophthalic acid unit represented by formula (g) in an amount of 0 to 35 mol % and the sulfobenzenedicarboxylic acid unit represented by formula (c) in an amount of 5 to 17 mol %:

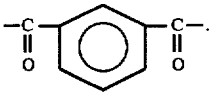

(g)

6. The electrophotographic transfer film according to claim 2, wherein the repeating unit of the dibasic acid component comprises the 2,6-naphthalenedicarboxylic acid unit represented by formula (b) in an amount of 60 to 95 mol %, an isophthalic acid unit represented by formula (g) in an amount of 0 to 35 mol % and the sulfobenzenedicarboxylic acid unit represented by formula (c) in an amount of 5 to 17 mol %:

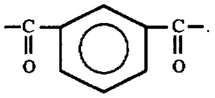

(g)

7. The electrophotographic transfer film according to claim 2, wherein the repeating unit of the dibasic acid component comprises the telephthalic acid unit represented by formula (a) in an amount of 0 to 90 mol %, the 2,6-naphthalenedicarboxylic acid unit represented by formula (b) in an amount of 10 to 90 mol %, an isophthalic acid unit represented by formula (g) in an amount of 0 to 35 mol % and the sulfobenzenedicarboxylic acid unit represented by formula (c) in an amount of 5 to 17 mol %:

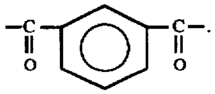

(g)

8. The electrophotographic transfer film according to claim 2, wherein the polyester has a number average molecular weight of 1,500 to 5,000.

9. The electrophotographic transfer film according to claim 2, wherein the polyester has a weight average molecular weight of 2,500 to 15,000.

10. The electrophotographic transfer film according to claim 2, wherein the polyester has a ratio of weight average molecular weight to number average molecular weight of 1.2 to 3.0.

11. The electrophotographic transfer film according to claim 2, wherein the image receiving layer forms a contact angle of not more than 50 degrees with a toner to be fixed, at a fixing temperature of the toner.

12. The electrophotographic transfer film according to claim 2, wherein the image receiving layer has a thickness of 1 to 8 μm.

13. The electrophotographic transfer film according to claim 2, wherein the transparent substrate comprises polyethyleneterephthalate.

* * * * *